(12) United States Patent
Bidlake et al.

(10) Patent No.: US 8,485,539 B2
(45) Date of Patent: Jul. 16, 2013

(54) ENCLOSED DECOUPLING STABILIZER

(75) Inventors: Christopher F. Bidlake, Naperville, IL (US); Dennis M. Mark, Buffalo Grove, IL (US)

(73) Assignee: Illinois Tool Works Inc., Glenview, IL (US)

( * ) Notice: Subject to any disclaimer, the term of this patent is extended or adjusted under 35 U.S.C. 154(b) by 463 days.

(21) Appl. No.: 12/740,870

(22) PCT Filed: Oct. 28, 2008

(86) PCT No.: PCT/US2008/081406
§ 371 (c)(1),
(2), (4) Date: Apr. 30, 2010

(87) PCT Pub. No.: WO2009/070404
PCT Pub. Date: Jun. 4, 2009

(65) Prior Publication Data
US 2010/0259024 A1    Oct. 14, 2010

Related U.S. Application Data

(60) Provisional application No. 60/991,560, filed on Nov. 30, 2007.

(51) Int. Cl.
*B60G 21/055* (2006.01)
*B60G 17/00* (2006.01)
*F16F 9/32* (2006.01)

(52) U.S. Cl.
USPC ...... 280/124.107; 280/124.101; 280/124.106; 280/5.506; 280/5.508; 188/300

(58) Field of Classification Search
USPC ............... 280/124.101, 124.102, 124.106, 280/124.107, 5.506, 5.508; 188/300, 302, 188/305, 306; 267/208
See application file for complete search history.

(56) References Cited

U.S. PATENT DOCUMENTS

| | | |
|---|---|---|
| 2006/0027990 A1 | 2/2006 | Dobson et al. |
| 2007/0034463 A1 * | 2/2007 | Huang .......................... 188/300 |
| 2007/0045978 A1 | 3/2007 | Beck et al. |

OTHER PUBLICATIONS

ISR for PCT/US2008/081406 dated Jan. 27, 2009.

* cited by examiner

*Primary Examiner* — Paul N Dickson
*Assistant Examiner* — Joselynn Y Sliteris
(74) *Attorney, Agent, or Firm* — Mark W. Croll; Paul F. Donovan

(57) ABSTRACT

A stabilizer for a vehicle suspension system includes a fixed housing having a canister and end caps forming an enclosure. A rod moves axially relative to the housing. Abutment members on the rod are separated by a spring and confront or telescope into end stops in the housing, depending upon a rotated position of the end stops relative to the abutment members.

28 Claims, 8 Drawing Sheets

US 8,485,539 B2

ENCLOSED DECOUPLING STABILIZER

CROSS-REFERENCE TO RELATED APPLICATIONS

The present nonprovisional United States Patent Application is a national phase of International Application No. PCT/US2008/081406, filed Oct. 28, 2008, and claims the benefits of U.S. Provisional Application for patent Ser. No. 60/991,560 filed on Nov. 30, 2007, the disclosures of which are incorporated herein in their entirety.

FIELD OF THE INVENTION

The present invention relates generally to suspension systems on motor vehicles, and particularly to stabilizer provided to inhibit roll of the vehicle. More particularly, the invention pertains to systems for decoupling the stabilizers.

BACKGROUND OF THE INVENTION

A driver may cause a vehicle to undergo a hard turn, a quick turn, or a series of hard and quick turns when encountering various driving conditions and situations. Such conditions can be experienced during high-speed maneuvers. Quick maneuvers also can occur to avoid accidents or objects in the roadway. When experiencing a hard, quick turn the vehicle body tends to elevate on one side and lower on the opposite side very suddenly. This condition is referred to as vehicle body roll. High profile vehicles such as trucks, sports utility vehicles, vans, all-terrain vehicles (ATVs) and the like experience roll conditions more readily than lower profile vehicles, such as passenger cars.

A variety of suspension and stabilizer systems have been used on vehicles of all types to improve passenger comfort and driving stability. Primary suspension system components can include springs and/or dampers providing spring force to suspend the vehicle body, controlling a single wheel assembly and movement relative to the vehicle frame. Primary suspension systems provide only minimal resistance to vehicle body roll. Roll stabilizer systems provide spring force to return the vehicle body to a neutral position or condition when forces from sudden vehicle movements have caused the body to lean one direction or another. Several types of stabilizer systems are known.

Torsion bar stabilizer systems have a stabilizer bar as a tension spring and links in series attached to the primary suspension system and vehicle frame. Single compensating stabilizer systems have one anti-roll compensator attached to the primary suspension via a bell crank or the like on each control arm. A dual compensating linear stabilizer system has two anti-roll compensators attached to the primary suspension with two bell cranks on each control arm, with each compensator attached to an upper bell crank on one control arm and to a lower bell crank on the other control arm. Stabilizer systems as described have achieved acceptance and operate effectively to return the vehicle to a neutral condition when vehicle body roll has been experienced.

For typical street and highway driving conditions it is desirable that a stabilizer system be always operating. However, off-road vehicles, including trucks, ATVs and the like, can be operated in severe terrain where one or more wheel may be severely displaced with respect to the other wheels. Commonly, operation in the most severe terrain conditions is performed at low speeds. It is desirable in some situations to operate without a stabilizer system so that the wheels can move independently, without interference or resistance from spring members in the stabilizer system. However, these same vehicles also may be operated on highways or in other high-speed conditions. The high profiles of such vehicles can result in the vehicle being more prone to roll than other vehicles. Accordingly, it is desirable that such vehicles have stabilizer systems for such high-speed operation. Disconnecting or removing stabilizer systems when vehicles are taken off road has been difficult and time consuming.

United States Patent Application Publication 2007/0045978 discloses structures and systems whereby stabilizers can be placed in active, operating conditions; and inactive, non-operating conditions as desired. In one embodiment disclosed therein a stabilizer includes a rotatable outer housing with fixed end caps. A rod extends into the housing through one end cap. Within the housing, a spring is disposed on the rod between washers. End stops connected to the housing for rotation therewith are disposed in the housing axially outwardly of the washers. The end stops define a central opening and outwardly extending channels from the central opening. Lands separate the channels. Each washer has a shape complementary to the shapes of the openings in the end stops and includes outwardly extending lobes. Depending on the relative rotational positions of the end stops relative to the washers, lobes on the washers are aligned either with lands or channels on the end stops. To activate and deactivate the stabilizer, the housing is rotated to rotate the end stops and align either the channels or the lands of the end stops with the lobes of the washer. Accordingly, upon axial movement of the rod, the washers and spring move axially relative to the end stops if the lobes of the washer are aligned with the channels of the end stops, and to the stabilizer is rendered in active. Conversely, if the lobes of the washers are aligned with the lands of the end stops, axial movement of the rod causes compression of the spring, and the stabilizer is active within the system.

While the stabilizers disclosed in the aforementioned published patent application can be used effectively as a system that can be coupled and decoupled selectively; the exposed, externally rotating parts can be undesirable. The decoupling stabilizers as described as therein can be difficult to seal from ambient conditions such as snow, rain, standing water, mud and dirt. Since the vehicles on which a decoupling stabilizer can be used advantageously maybe used off road and in adverse conditions, adequate sealing against contaminant intrusion is desirable.

SUMMARY OF THE INVENTION

The present invention provides a decoupling stabilizer that is sealed more easily from ambient conditions by incorporating all moving parts within a fixed outer housing forming an enclosure with only a minimal opening for an operating cable or the like.

In one aspect of one form thereof, the present invention provides a stabilizer for a vehicle suspension system with a housing including a canister and end caps fixed to opposite ends of the canister. A rod extends into the housing through one of the end caps. The rod and the housing are axially movable relative to one another. A fixed end is secured relative to the other of the end caps. End stops are disposed within the housing at opposite ends. The end stops are rotatable within the housing relative to the end caps and the canister. First and second abutment members are provided on the rod. Means are provided for selectively rotating the end stops within the housing relative to the end caps and the canister for establishing engagement and disengagement positions between the end stops and the abutment members upon relative axial movement between the rod and the housing.

In another aspect of another form thereof, the present invention provides a vehicle stabilizer with a housing having a hollow canister and first and second end caps on opposite ends thereof. The canister is rotatably fixed relative to the end caps. A fixed end is secured relative to the first end cap. A movable end is connected to an axially movable rod, with the rod extending through the second end cap and into the housing. A resilient member is disposed on the rod in the housing, with first and second washers on the rod at opposite ends of the resilient member. First and second end stops at opposite ends in the housing are rotatable within the housing relative to the canister. Openings in the end stops include a central portion and spaced channels radially outwardly from the central portion, with lands disposed between the channels. The first and second washers have peripheral shapes including radially outwardly extending lobes of size and configuration to slide into the channels in the end stops with the end stops in one rotated position, and to abut the lands with the end stops in an other rotated position.

In a further aspect of a further form thereof, the present invention provides a vehicle stabilizer with a substantially enclosed housing, an end stop disposed in the housing; a rod movable axially in the housing and an abutment member on the rod. One of the end stop and the abutment member is rotatable within the housing relative to the housing and to the other of the end stop and the abutment member. The end stop and the abutment member have complementary shapes such that in one relative rotated position of the end stop and the abutment member a confronting relationship is established of one against the other, and a telescoping relationship is established of one sliding within the other in another rotated relative position of the end stop and the abutment member. A spring acts against the abutment member axially in the housing with the abutment member confronting the end stop upon axial force being applied against the rod.

An advantage of the present invention in one form is providing a stabilizer system for vehicles that can be rendered operative or inoperative selectively, in a convenient and rapid manner.

Another advantage of the present invention in another form is providing a decoupling stabilizer system useful for off-road vehicles to render stabilizer systems operative and inoperative selectively.

Another advantage of the present invention in a further form is providing decoupling stabilizer systems that can be protected against contaminant intrusion.

Another advantage of the present invention in still another form is providing a decoupling stabilizer system with moving parts disposed internally within housing, and without external moving parts.

Other features and advantages of the invention will become apparent to those skilled in the art upon review of the following detailed description, claims and drawings in which like numerals are used to designate like features.

Figure 1:
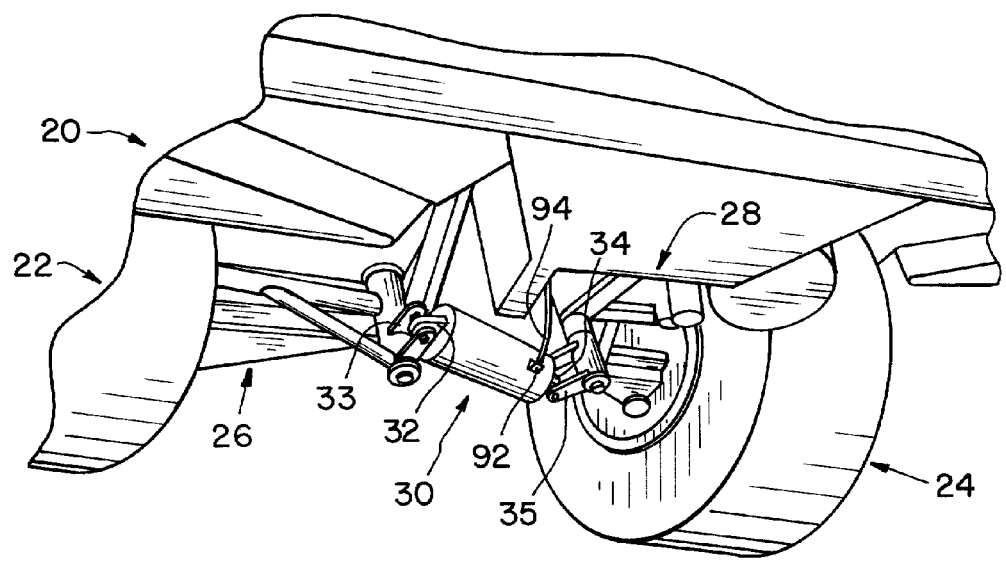
FIG. 1 is a fragmentary perspective view of a so-called "all-terrain vehicle" (ATV) with an enclosed decoupling stabilizer of the present invention installed therein.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular an all-terrain vehicle 20 is shown, including wheel assemblies 22 and 24 having suspension assemblies 26 and 28, respectively. An enclosed decoupling stabilizer 30 in accordance with the present invention is installed between suspension systems 26 and 28.

Decoupling stabilizer 30 of the present invention includes a fixed end 32 coupled by a clevis 33 to suspension system 26 and an axially movable end 34 coupled by a clevis 35 to suspension assembly 28. Stabilizer 30 can be provided of different size and general shape for use in vehicles of different types, including for example, ATVs and other off-road vehicles.

Figure 2:
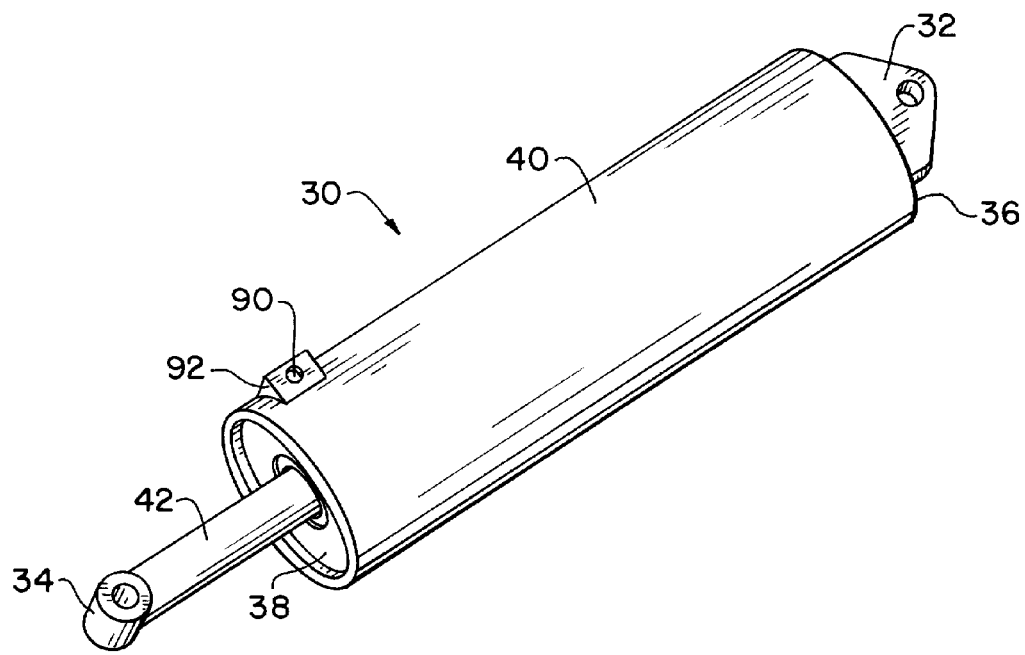
FIG. 2 is a perspective view of an enclosed decoupling stabilizer in accordance with a first embodiment the present invention.

With reference now to FIG. 2, decoupling stabilizer 30 includes a housing having first and second fixed end caps 36 and 38 on opposite ends of an outer canister 40. End caps 36 and 38 can be affixed or joined to canister 40 so as to form an effective seal against contaminant intrusion between the end caps and canister. Fixed end 32 can be attached to end cap 36 by welding, riveting or other attachment means, or can be made as a monolithic body with end cap 36. End cap 36 can be joined to canister 40 by welding, crimping or other attachment means, or can be formed as a monolithic body with canister 40. Any attachment of end cap 36 to canister 40 is made to seal the structure and prevent intrusion of contaminants. A rod 42 is connected to axially movable end 34 and extends into housing 40 through end cap 38. Rod 42 is connected to and moves axially with movable end 34, as movable end 34 is placed in compression or tension within a vehicle suspension system in which stabilizer 30 is installed. End cap 38, together with other internal components of stabilizer 30 to be described subsequently herein, is assembled on to rod 42 and inserted into canister 40. Thereafter, end cap 38 is connected to canister 40 by welding, crimping or other attachment means so as to inhibit contaminant intrusion. After final assembly, end caps 36, 38 and canister 40 form a substantially closed and sealed environment for the operation of the internal components of stabilizer 3 therein.

Figure 3:
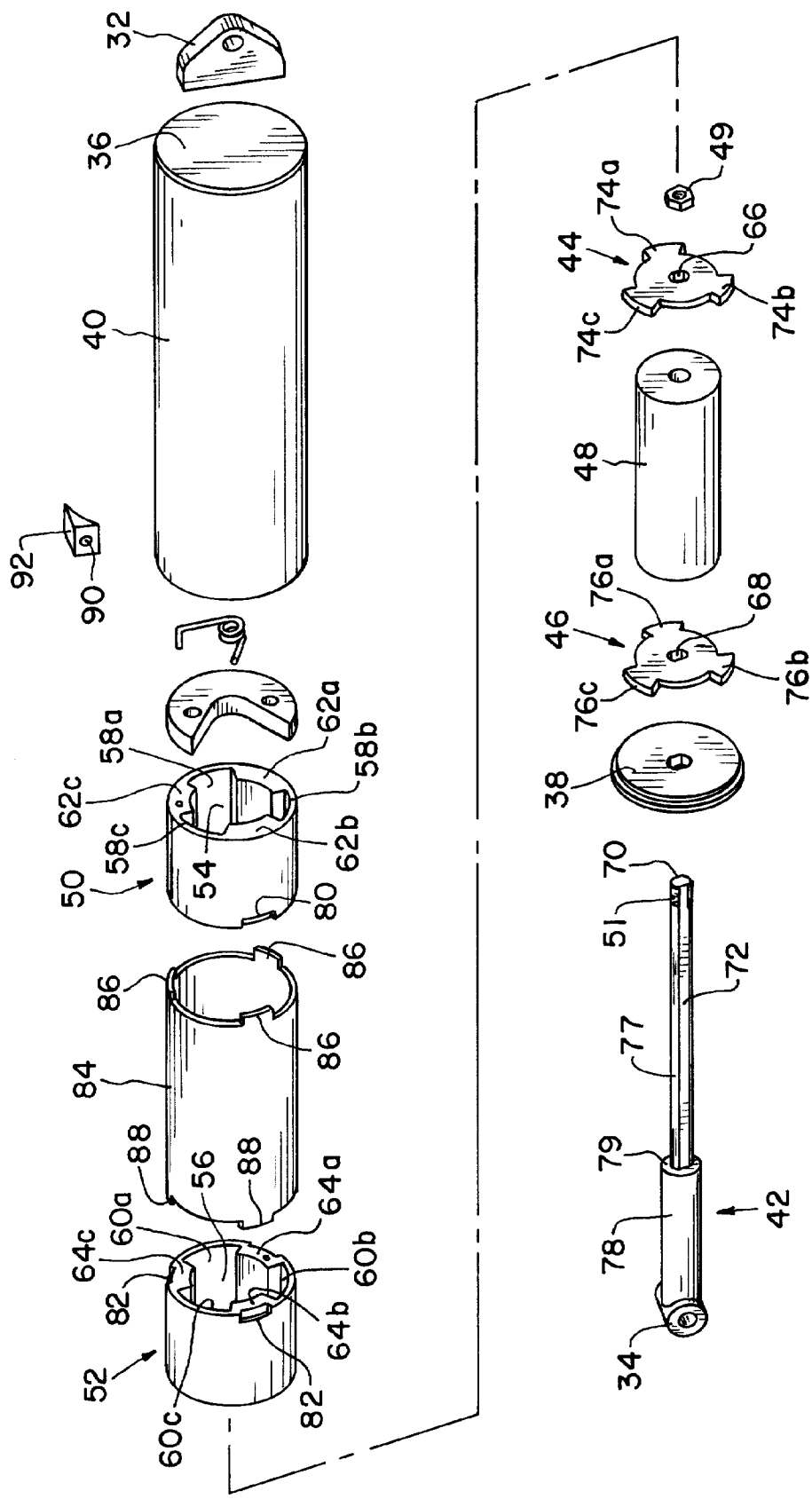
FIG. 3 is an exploded view of the decoupling stabilizer shown in FIG. 1.

Referring now to FIG. 3, within housing 40, first and second spaced abutment members such as washers 44, 46 are disposed on rod 42. A spring member 48 also is disposed on rod 42, between washers 44, 46. While illustrated in the exemplary embodiment as a resilient, rubber-like cylindrical member of natural or synthetic rubbers, those skilled in the art should readily understand that spring member 48 could be a helical spring or a spring-member of structures other than a helical spring. Washers 44 and 46 with spring member 48 disposed there between can be assembled onto rod 42 and held in place by, for example, a nut 49 on a threaded end 51 of rod 42.

End stops 50, 52 are disposed in housing 40, axially outwardly of washers 44, 46 respectively. Accordingly, end stop 50 is disposed between end cap 36 and washer 44 and end stop 52 is disposed between end cap 38 and washer 46. End stops 50, 52 are rotatable within and relative to housing 40 and end caps 36 and 38.

Each end stop 50, 52 is a substantially cylindrical body having a central opening 54, 56 respectively. Openings 54, 56 have a center portion and define one or more axial channel of greatest radial distance from an axial center of opening 54. In the exemplary embodiment shown, end stops 50, 52 each include three axial channels, with end stop 50 being shown with axial channels 58a, 58b, and 58c; and end stop 52 being shown with axial channels 60a, 60b and 60c, respectively. Individually and collectively hereinafter the axial channels of end stops 50, 52 will be referred to as channel 58 or channels 58 and channel 60 or channels 60, respectively. Channels 58 and 60 of each end stop 50 and 52 are spaced one from another, and are separated by lands. In the exemplary embodiment shown, and stops 50, 52 each include three lands, with end stop 50 being shown with lands 62a, 62b and 62c; and end stop 52 being shown with lands 64a, 64b and 64c, respectively. Individually and collectively hereinafter the lands of end stops 50, 52 will be referred to as land 62 or lands 62 and land 64 or lands 64, respectively.

Washers 44 and 46 have shapes that are complementary to the shapes of openings 54, 56 in end stops 50, 52. Accordingly, washers 44 and 46 have relatively small central holes 66, 68 through which rod 42 extends. The holes are shaped together with an exterior surface of rod 42 so that washers 44, 46 are not rotatable on rod 42. In the exemplary embodiment shown, an inner portion of rod 42 includes flat sides 70, 72, and holes 66, 68 are correspondingly shaped so as to restrain washers 44, 46 from rotating on shaft 42. Washers 44, 46 otherwise are substantially solid bodies, having radially outwardly extending lobes of a number, size and shape to fit within channels 58 and 60, respectively. Accordingly, washer 44 of the exemplary embodiment includes three lobes 74a, 74b and 74c; and washer 46 includes three lobes 76a, 76b and 76c. Individually and collectively hereinafter the lobes of each washer 44, 46 will be referred to as lobe 74 or lobes 74 and lobe 76 or lobes 76, respectively. Thus, depending on the relative rotational positions of end stops 50, 52 relative to washers 44, 46; lobes 74 and 76 are aligned with either lands 62, 64 or channels 58, 60.

Rod 42 includes a reduced a diameter portion 77 and a larger diameter portion 78 and defines a shoulder 79 at the transition between reduced diameter portion 77 and larger diameter portion 78. Washer 46 is constrained from axial movement toward or along larger diameter portion 78 by shoulder 79, which is of larger diameter than hole 68 in washer 46. Washer 44 is held in position by nut 49, as previously described. Accordingly, in the assembled configuration, washers 44 and 46 can be moved toward one another by compression of spring member 48. Movement of washers 44, 46 axially away from each other is limited as a result of the outward axial constraint of each washer 44, 46.

Axially inner ends of end stops 50, 52 define one or more pocket or notch 80, 82 respectively. A sleeve 84 defines tabs 86, 88 on opposite ends thereof of number, size and location to engage notches 80, 82. Sleeve 84 is of a diameter such that tabs 86, 88 are received in notches 80, 82 to provide rotational engagement of end stops 50, 52 and sleeve 84 so that as one rotates within canister 40, all rotate within canister 40. In the assembled configuration of stabilizer 30, sleeve 84 rotatably surrounds washers 44 and 46 as well as spring member 48 disposed there between.

A cable access port 90 is provided in a boss 92 in canister 40 for receiving a cable 94 (FIG. 1) there through to engage end stop 52. The cable is thereby used to rotate end stop 52 directly and end stop 50 indirectly by the rotational engagement of sleeve 84 to both end stop 50 and end stop 52.

Figure 4:
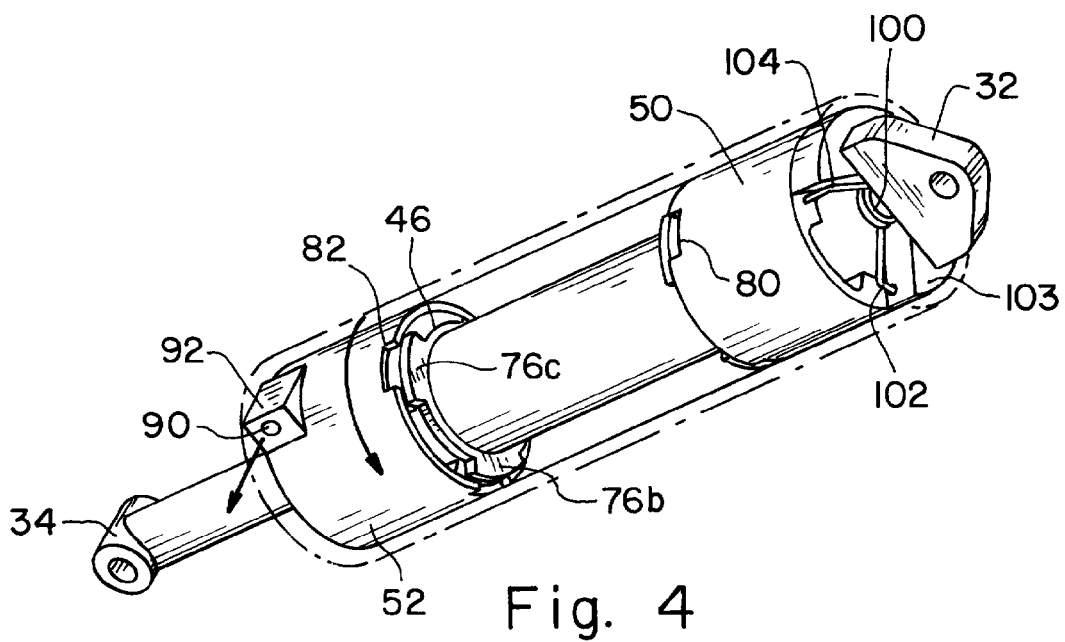
FIG. 4 is a perspective illustration of some of the internal components of the decoupling stabilizer of FIGS. 2 and 3.
Figure 6:
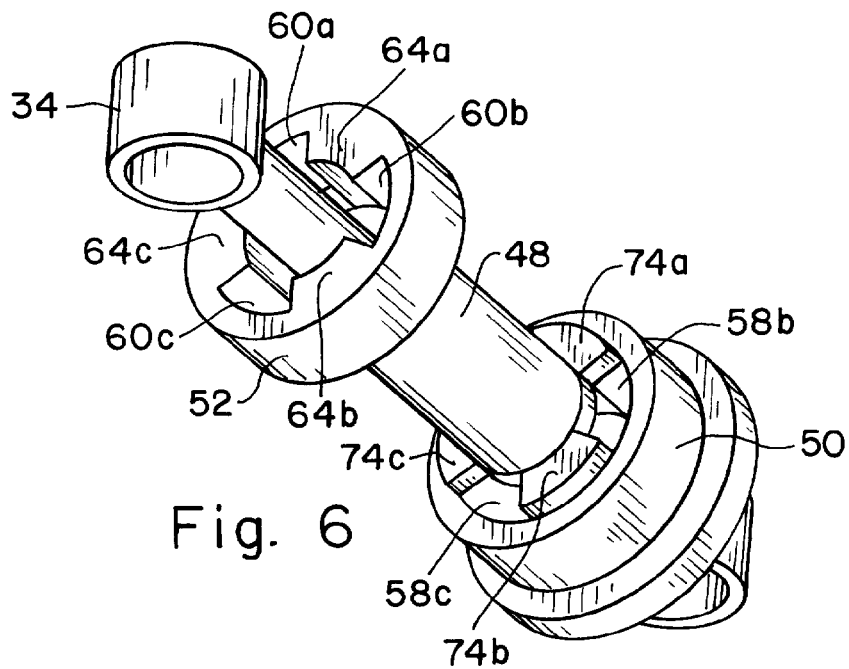
FIG. 6 is a perspective illustration of the internal components of the decoupling stabilizer in an engaged position.
Figure 7:
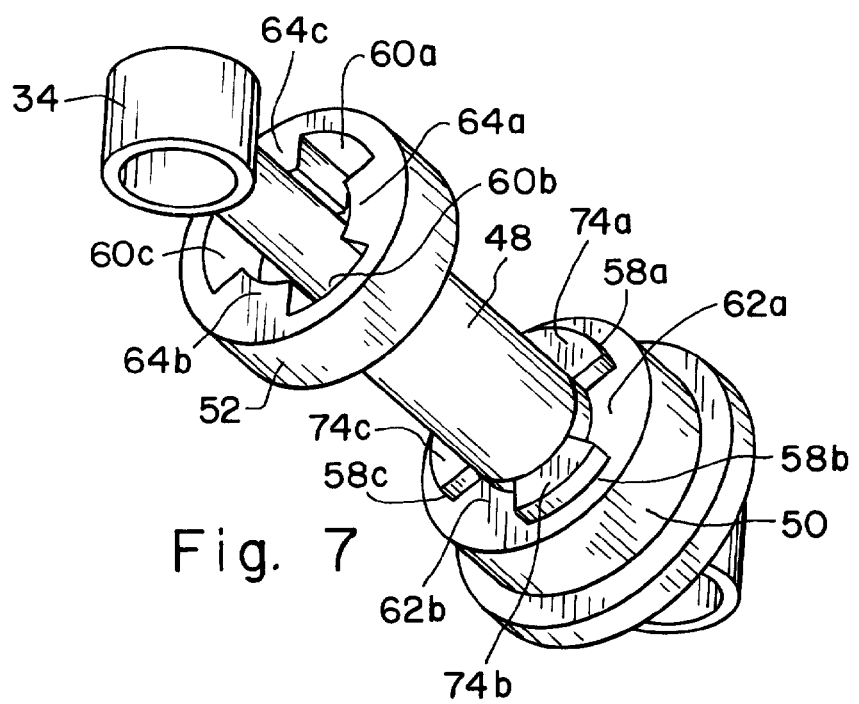
FIG. 7 is a perspective illustration of the internal components of the decoupling stabilizer in a disengaged position.
Figure 8:
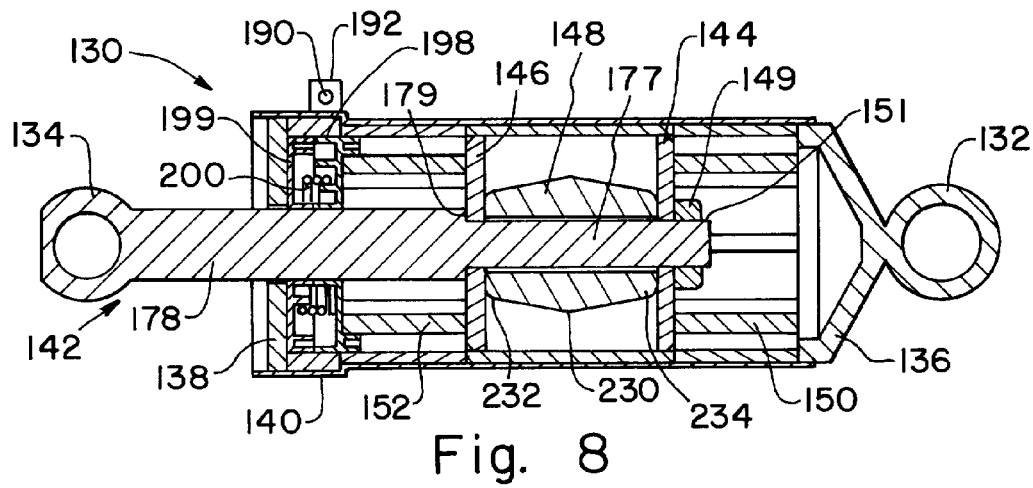
FIG. 8 is a cross-sectional view of another embodiment for a decoupling stabilizer in accordance with the present invention.

To activate and deactivate stabilizer 30, the interconnected assembly of end stops 50, 52 and sleeve 84 is rotated within canister 40. Washers 44, 46 are not rotatable relative to rod 42 or canister 40, and thus stay in fixed rotational positions as end stops 50, 52 and sleeve 84 are rotated. Accordingly, in a first rotational position, lobes 74, 76 of washers 44, 46 are aligned with lands 62, 64 of end stops 50, 52. If movable end 34 is compressed toward fixed end 32, axial movement compresses spring member 48 as washer 46 is pushed against spring member 48 while washer 44 is constrained against an axial movement by end stop 50, with lobes 74 of washer 44 abutted against lands 62 of end stop 50. As compressive force on movable end 34 is released, spring member 48 urges washer 46 outwardly, thus moving rod 42 and movable end 34 back to the neutral position. Conversely, if movable end 34 is placed in tension, washer 46 is constrained against axial movement by end 52, with lobes 76 abutted against lands 64. Washer 44 is drawn against spring member 48, and spring member 48 again is compressed between washers 44, 46. When tension forces are released, spring member 48 urges washer 44 outwardly, and stabilizer 30 returns to the neutral condition In the orientations just described, with end stops 50, 52 rotated into positions in which lands 62, 64 and lobes 74, 76 are aligned, stabilizer 30 is in an activated state and functions both in compression and tension from movement of movable end 34. FIG. 4 illustrates lobes 74, 76 of washers 44, 46 aligned with lands 62, 64 of end stops 50, 52. For purposes of illustration, in FIG. 4 sleeve 84 has been omitted so that the aligned relationship of the lobes 74, 76 and lands 62, 64 can be shown. FIG. 6 is a further simplified illustration showing the washers and end stops positioned for stabilizer 30 to be in an active or operating condition To deactivate stabilizer 30, the interconnected assembly of end stops 50, 52 and sleeve 84 is rotated within canister 40 to a second rotational position in which lobes 74 and 76 align with channels 58 and 60. If movable end 34 is placed in compression, washer 46 is again urged against spring member 48. However, as axial force is applied against washer 44 via spring member 48, washer 44 slides into end stop 50, with lobes 74 sliding axially along channels 58. Spring member 48 is not compressed. Similarly, if movable end 34 is placed in tension, washer 44 is pulled against spring member 48, which in turn draws washer 46 into end stop 52 as lobes 76 slide along channels 60. Again spring member 48 is not compressed. Accordingly, stabilizer 30 is effectively deactivated within the suspension system in which it is installed, and does not perform. FIG. 7 is a simplified illustration similar to FIG. 6, but showing the stabilizer components in an inactive, non-operating condition.

Figure 5:
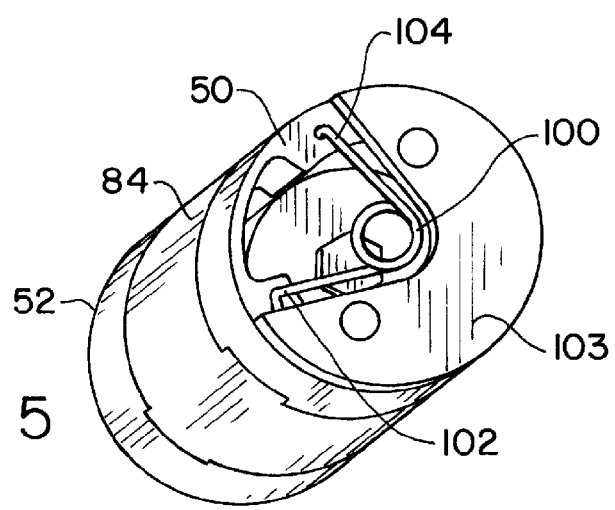
FIG. 5 is an end view of the internal components of the decoupling stabilizer shown in the previous drawings.

The interconnected assembly of end stops 50, 52 and sleeve 84 can be biased to a desired condition so that stabilizer 30 is either active or inactive in a default position. A torsion spring 100 has one leg 102 engaged with a spring housing 103 that is affixed to end cap 36 and a second leg 104 engaged with end stop 50. Spring housing 103 is non-rotatably secured within the assembly, affixed to end cap 36 and/or canister 40, or housing 103 can be formed as an integral part of end cap 36 or canister 40. Torsion spring 100 acts against and causes rotation of end stop 50 relative to spring housing 103. Accordingly, end stop 50 along with sleeve 84 and end stop 52 engaged therewith are urged to a desired rotational position relative to washers 44 and 46. To provide default security of stabilizer performance, it may be desirable to assemble stabilizer 30 with an active default position. FIG. 5 shows the installed assembly of end stops 50 and 52, sleeve 84, spring 100 and a spring housing 103, with legs 102, 104 connected to spring housing 103 and end stop 50 respectively.

End caps 36 and 38 and canister 40 can be sealed whereby moisture, dirt and other contaminants are kept from the operating components contained within canister 40. Cable 94 extended through cable access port 90 can be sealed or protected against contaminant intrusion relatively easily by a grommet or other seal in access port 90 and a sheath on the cable 94. Further, end caps 36, 38 and canister 40 can be made strong and durable joined to one another in a rigid construction to resist physical damage of the parts contained therein.

FIGS. 8-13 illustrate a second embodiment of a decoupling stabilizer 130 in accordance with the present invention. Stabilizer 130 includes a fixed end 132 and a movable end 134 which can be connected within a vehicle suspension system in a manner similar to that described previously herein. End caps 136 and 138 are provided at opposite ends of a canister 140 to provide an enclosed protectable environment for the coupling/decoupling components. A rod 142 has washers 144, 146 disposed thereon, with a spring member 148 there between. Washers 144, 146 work in co-operation with end stops 150, 152 in coupling/decoupling operations in a manner similar to that described previously.

Figure 9:
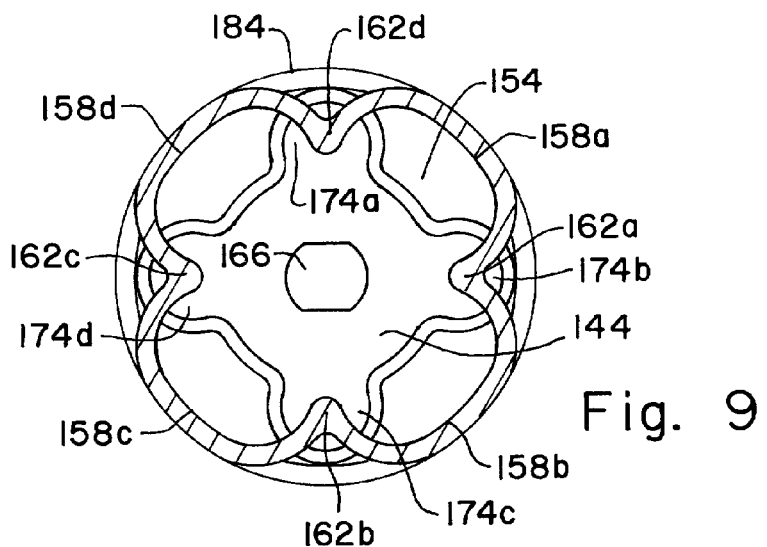
FIG. 9 is an end view of internal components for the decoupling stabilizer of FIG. 8, illustrating the stabilizer in an engaged condition.
Figure 10:
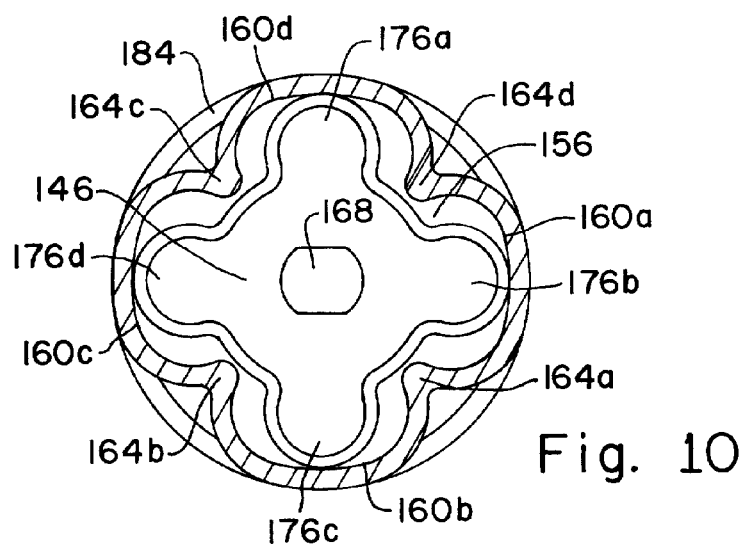
FIG. 10 is an end view of the opposite end from that shown in FIG. 9, and illustrating the stabilizer in a disengaged condition.

As best seen in FIGS. 9 and 10, end stops 150, 152 are relatively thin hollow structures having open interiors 154, 156. Each end stop 150, 152 defines four axial channels therein. Accordingly, and stop 150 defines an axial channels 158a-d and end stop 152 defines an axial channels 160a-d, individually and collectively referred to herein after as channel or channels 158 or 160, respectively. Axial channels 158, 160 in each end stop 150, 152 curve inwardly to define inwardly directed lands configured as triangular peaks or points 162a-d and 164a-d, respectively; which are individually and collectively referred to herein as land or lands 162, 164, respectively. FIG. 9 illustrates washer 144 and end stop 150 in an active or operating condition, and FIG. 10 illustrates washer 146 and end stop 152 in an inactive or non-operating condition.

Washers 144, 146 define holes 166, 168 similar to holes 66, 68 defined and described previously herein for engagement against flat sides of rod 142. Each washer 144, 146 is a substantially continuous body defining four rounded lobes at the periphery thereof. Accordingly, washer 144 defines lobes 174a-d, and washer 146 defines lobes 176a-d. Individually and collectively hereinafter lobes 174a-d will be referred to as lobe or lobes 174 and lobes 176a-d will be referred to as lobe or lobes 176.

Rod 142 includes a reduced diameter portion 177 and a larger diameter portion 178 establishing a shoulder 179 there between. The assembly of washers 144, 146 and spring member 148 on rod 142 is secured by a nut 149 engaged on a threaded end 151 of rod 142. Accordingly, rod 142 is similar in structure to rod 42 as described previously herein.

Figure 13:
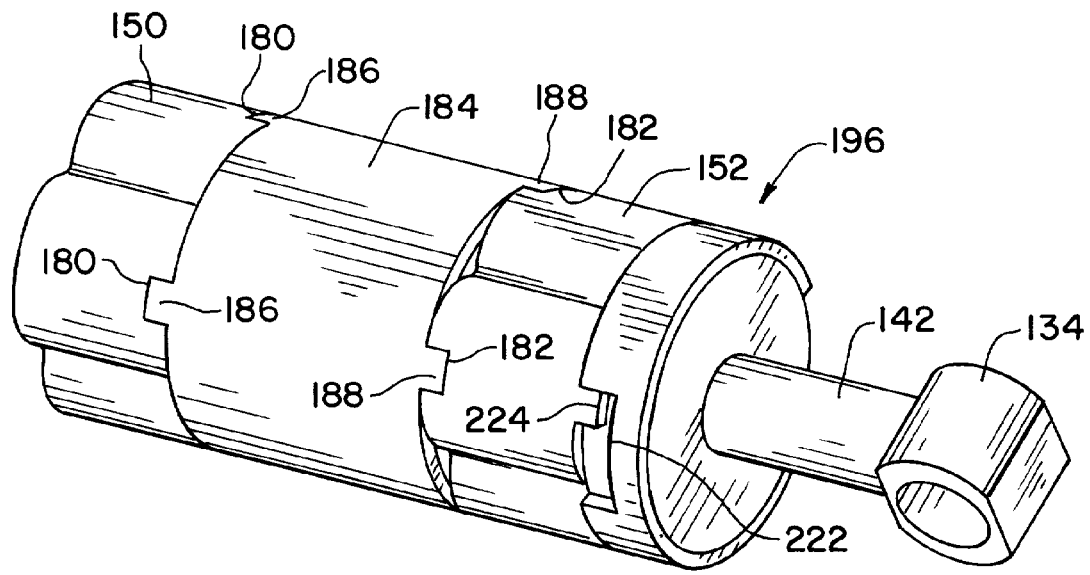
FIG. 13 is a perspective view of the internal assembly of the decoupling stabilizer of the second embodiment.

End stops 150, 152 are provided with notches 180, 182 respectively, at the axially inwardly directed ends thereof; and a sleeve 184 is provided with tabs 186, 188 at the opposite ends thereof of corresponding size and position for engaging notches 180, 182 respectively (FIG. 13). Accordingly, through the inter-engagement of sleeve 184 with end stops 150, 152 the assembly thereof is co-rotational as described previously for end stops 50, 52 and sleeve 84 of stabilizer 30.

Figure 11:
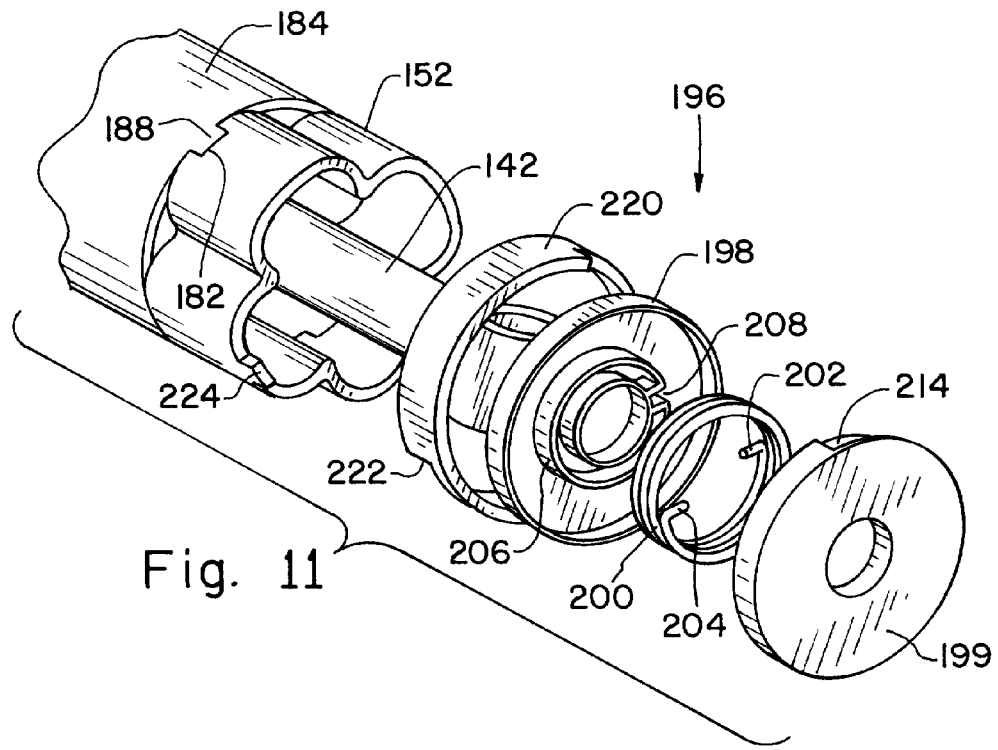
FIG. 11 is an exploded view of one end of the decoupling stabilizer shown in FIGS. 8-10.
Figure 12:
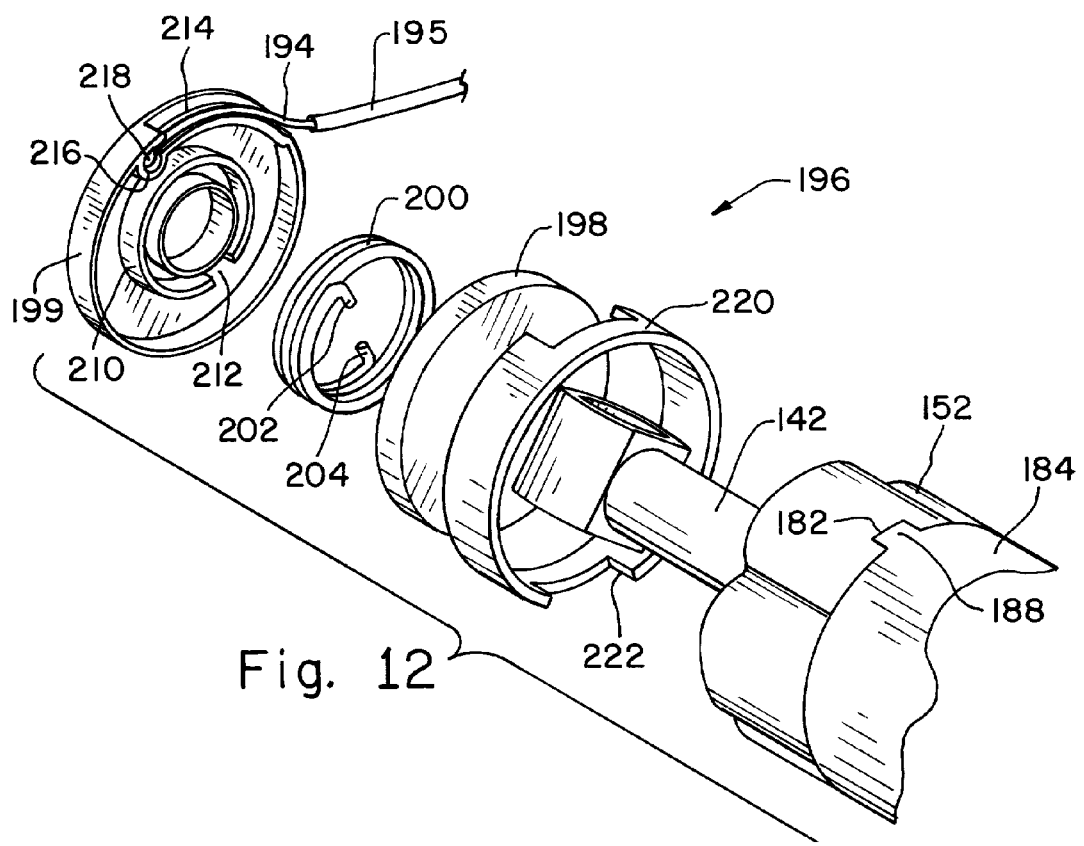
FIG. 12 is an exploded showing the same end of the stabilizer as shown in FIG. 11 but taken from a different angle.

A cable access port 190 is provided in a boss 192 (FIG. 8) through which an operating cable 194 have a sheath 195 can be connected to a spring assembly 196 (FIGS. 11 and 12). Spring assembly 196 and the connection for cable 194 extending through cable port 190 are provided at the same end of stabilizer 134, for better balance and reduced friction, wear and binding. Spring assembly 196 includes a spring housing consisting of mating inner and outer housing parts 198, 199 and a torsion spring 200 contained between inner and outer housing parts 198, 199. Torsion spring 200 includes first and second legs 202, 204 secured to inner and outer housing parts 198, 199, respectively. Within spring assembly 196, inner housing part 198 defines a ring 206 having a slot 208 for receiving and engaging first leg 202 of torsion spring 200, and outer housing part 199 defines a ring 210 having than a slot 212 for receiving and engaging second leg 204 of torsion spring 200. Torsion spring 200 is positioned and retained by surrounding rings 206, 210, with legs 202 and 204 of spring 200 disposed in slots 208, 212 defined in the rings. A cable channel 214 is provided also on outer housing part 199 and may include an enlarged hollow 216 at the end thereof for receiving and retaining operating cable 194 with an enlarged end or ball 218, the cable being used to adjust stabilizer 130 between active and in active positions. Spring assembly 196 further includes a hoop 220 with a notch 222 for operationally engaging a tab 224 at the axially outwardly directed end of end stop 152.

Various structures can be used for spring member 148, as described previously for spring member 48. In the exemplary embodiment shown, spring member 148 is a barrel-like body of elastomeric material having a wider diameter waist 230 intermediate narrower diameter ends 232, 234. Accordingly, controlled, directed deflection is provided when spring member 148 is compressed between washers 144, 146. It should be understood that a spring member such as that just described for spring member 148 can be used also in stabilizer 30, described previously, to control random buckling and improve fatigue and wear characteristics.

In the operation and use of stabilizer 130, when lobes 174, 176 are aligned with axial channels 158, 160 stabilizer 130 is inactive in that washers 144, 146 can telescope into end stops 150, 152 in a manner similar to that described previously for washers 44, 46 and end stops 50, 52 of stabilizer 30 in the deactivated condition. When lobes 174, 176 are aligned with lands 162, 164, stabilizer 130 is in an active condition similar to that described previously for stabilizer 30 when lobes 74, 76 are aligned with lands 62, 64. Adjustment of stabilizer 130 between the active and inactive positions is performed similarly to that described for stabilizer 30. Further, torsion spring 200 biases stabilizer 130 to one of the conditions, as desired based on assembly. To ensure operation of stabilizers 30 and 130 during higher-speed operation of a vehicle in which it is installed, biasing to the active or operational condition may be preferred.

Stabilizer 130 is more quickly responsive than stabilizer 30 for adjustment between active and de-active conditions as a result of having four channels and four lobes in comparison to the three channels and three lobes of stabilizer 30. A smaller rotational arc is required to adjust stabilizer 130 than to adjust stabilizer 30 between active and de-active positions. Further, since the four lobe and four channel configuration is symmetric, rotation of rod 142 prior to installation in a vehicle does not alter the operational positioning of the washers with respect to the end stops. In the previous embodiment, with rod 42 rotated in one position for installation lobes 74, 76 of washers 44, 46 will align with channels 58, 60 placing stabilizer 30 in a de-active condition under the biasing influence of torsion spring 100. However, if rod 42 is rotated 180° prior to installation in a vehicle, lobes 74, 76 will align with lands 62, 64 and stabilizer 130 will be in an active condition under the biasing influence of torsion spring 100. The symmetric structures for washers 144, 146 and end stops 150, 152 of stabilizer 130 result in the stabilizer being in the same operational position regardless of the rotational position of rod 142 during installation in a vehicle suspension system. Accordingly, during assembly the stabilizer can be arranged to be active or de-active as a default condition under the biasing of spring 200, and with no pre-installation alignment or positioning being required to ensure the desired default operating condition.

Channels 158, 160 can be made relatively wider than lobes 174, 176, thereby relaxing manufacturing tolerances and the precision required for the operating adjustment of stabilizer 130 when placing the stabilizer in a de-active or in-operative position. However, the cloverleaf design allows washers 144, 146 to be supported quickly and robustly at four locations when the end stops are rotated to the active or operating position with lobes 174, 176 overlying lands 162, 164. The four-point support allows the use of thinner material for end stops 150, 152, thereby reducing material requirements and weight.

Stabilizers of the present invention can be operated through manual means for selectively rotating the end stops within the housing, such as the cables described previously herein; and through electro-mechanical means including operators activated by switches, etc. The operating adjustment, whether active or inactive, can be sensed and displayed on vehicle control panels by indicator lights or other notifications. Further, a sensor in the stabilizer can provide feedback to the operator and can communicate with engine control units to adjust automatically to desired operating conditions depending on sensed vehicle performance and conditions.

Figure 14:
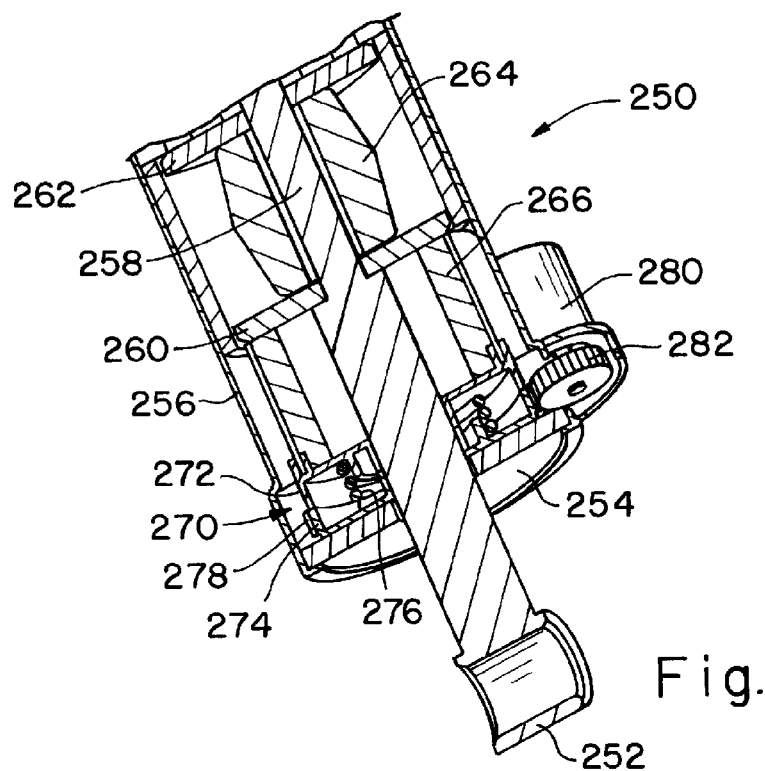
FIG. 14 is a fragmentary cross-sectional view of still another embodiment for a decoupling stabilizer in accordance with the present invention.
Figure 15:
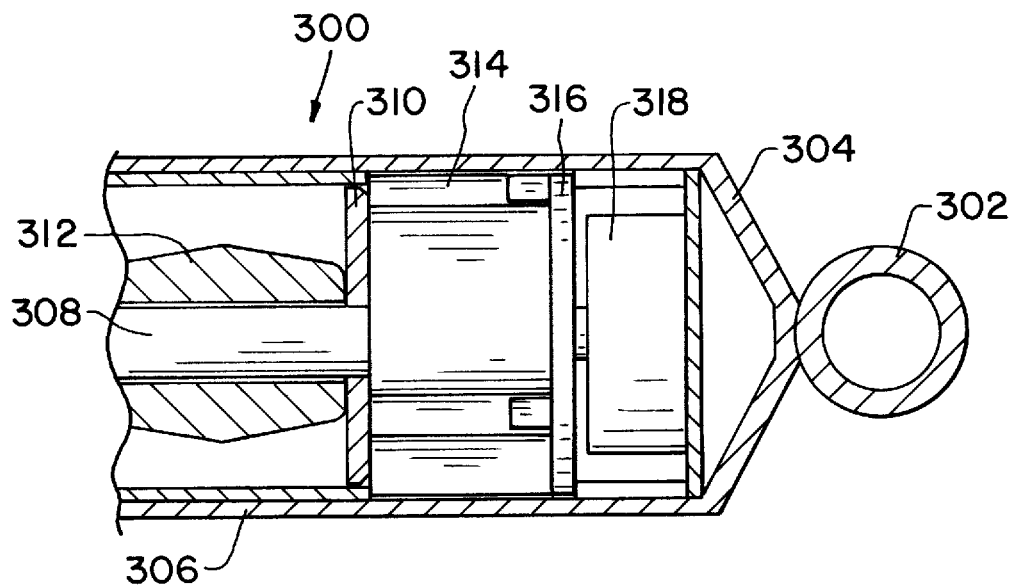
FIG. 15 is a fragmentary cross-sectional view of yet another embodiment for a decoupling stabilizer in accordance with the present invention.
Figure 16:
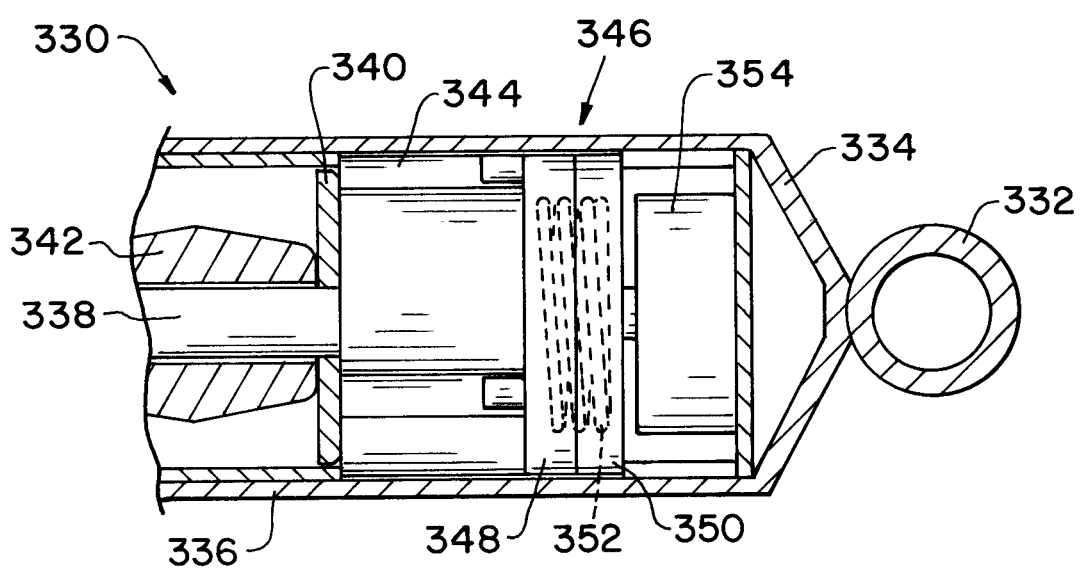
FIG. 16 is a fragmentary cross-sectional view of a further embodiment for a decoupling stabilizer in accordance with the present invention.

FIGS. 14, 15 and 16 are exemplary illustrations of embodiments of the present invention in which the means for selectively rotating the end stops within the housing includes motors on or in the stabilizers to adjust the stabilizers between active and inactive positions. A cable and lever arrangement is not required, and control of the motors can be precise and automatic under prescribed conditions. The motorized embodiments shown are merely exemplary in nature and still other electromechanical operators can be used.

Exemplary decoupling stabilizer 250 (FIG. 14) is similar in construction to decoupling stabilizer 130 described previously with respect to the internal working components of washers on a rod biased by a spring member, and with the washers cooperating with end stops to render the stabilizer active or inactive depending on relative rotational positions between the end stops and washers. Accordingly, stabilizer 250 includes a movable end 252 which is axially slidable relative to an end cap 254 on a canister 256. Movable end 252 is formed on a rod 258. Rod 258 has washers 260, 262 disposed thereon, with a spring member 264 there between. Washer 260 works in cooperation with an end stop 266 and washer 262 works in cooperation with an end stop not shown in a manner similar to the washers and end stops described previously with respect to decoupling stabilizer 130. A spring assembly 270 includes an inner housing part 272 and an outer housing part 274 with a torsion spring 276 contained there between. Torsion spring 276 is secured to both inner housing part 272 and outer housing part 274. Inner housing part 272 is drivingly engaged with end stop 266. External gear teeth 278 are provided on outer housing part 274. A motor 280 having an output gear 282 is contained within a sealed enclosure forming a part of canister 256. Output gear 282 is drivingly coupled with external gear teeth 278 to effectuate rotational adjustment of decoupling stabilizer 250 between active and inactive operating conditions upon operation of motor 280. Motor 280 can be a stepper motor or other precisely controllable motor to effectuate precise, minimal rotation. Upon operation of motor 280, output gear 282 drives external gear teeth 278 to cause rotation of outer housing part 274. Outer housing part 274 rotates inner housing part 272 via the drivingly coupled engagement of torsion spring 276 to both inner housing part 272 and outer housing part 274. Rotation of inner housing part 272 rotates end stop 266 to change its relative rotational position with respect to washer 260. It should be understood that an end stop (not shown) at the opposite end of stabilizer 250 is also rotated with respect to washer 262 as described previously with respect to decoupling stabilizer 130. Rotation of the end stops adjusts decoupling stabilizer 250 between active and inactive conditions.

FIG. 15 illustrates a direct drive embodiment for a decoupling stabilizer 300 which again is similar in construction to decoupling stabilizer 130 with respect to the internal working components, including a rod having washers thereon separated by a spring member, with the washers cooperating with end stops to render the stabilizer active or inactive. In the exemplary embodiment of stabilizer 300, motorized operation is performed at the fixed end of the stabilizer. Accordingly, decoupling stabilizer 300 includes a fixed end 302 on an end cap 304 of a canister 306 A rod 308 has a washer 310 disposed thereon, as well as a spring member 312 and a second washer (not shown). Washer 310 works in cooperation with an end stop 314 as described previously with respect to the washers and end stops of decoupling stabilizer 130. A drive plate 316 is drivingly engaged with end stop 314, and a motor 318 is drivingly engaged with drive plate 316. In this direct drive exemplary embodiment, motor 318 is a stepper motor or other drive device for controlled minimal rotation to adjust stabilizer 300 between active and inactive adjustments. Operation of motor 318 rotates drive plate 316, which in turn rotates end stop 314 to alter the relative rotational positioning between end stop 314 and washer 310. It should be understood that an end stop (not shown) at the opposite end of stabilizer 300 is rotated also with respect to a second washer (not shown) on rod 308, as described previously with respect to decoupling stabilizer 130, when stabilizer 300 is adjusted between active and inactive positions.

FIG. 16 illustrates still another exemplary embodiment for a decoupling stabilizer 330 also in accordance with the present invention and similar to stabilizer 300. Accordingly, stabilizer 330 includes a fixed end 332 on an end cap 334 of a canister 336. A rod 338 has a washer 340 disposed thereon as well as a spring member 342 and a second washer (not shown). Washer 340 works in cooperation with an end stop 344 as described previously with respect to the washers and end stops of decoupling stabilizer 130. The second washer (not shown) works in cooperation with a second end stop (not shown) at the opposite end of stabilizer 330. A spring assembly 346 includes an inner housing part 348 and an outer housing part 350 with a torsion spring 352 contained therebetween, with one end of torsion spring 352 connected to inner housing part 348 and an opposite end of torsion spring 352 connected to outer housing part 350. A motor 354 is drivingly coupled to outer housing part 350. Controlled operation of motor 354 rotates outer housing part 350, which in turn rotates inner housing part 348 via torsion spring 352 coupled between the housing parts. Inner housing part 348 is drivingly coupled to end stop 344 so that rotation of inner housing part 348 also rotates end stop 344 to effectuate controlled rotation of end stop 344 and adjustment of stabilizer 330 between active and inactive conditions in a manner similar to that described with respect to decoupling stabilizer 130. Again, it should be understood that an end stop at the opposite end of stabilizer 330 is rotated and adjusted simultaneously with end stop 344.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A stabilizer for a vehicle suspension system, said stabilizer comprising:
   a housing including a canister and end caps fixed to opposite ends of said canister;
   a rod extending into said housing through one of said end caps, said rod and said housing being axially movable relative to one another;
   a fixed end secured relative to the other of said end caps;
   end stops within said housing at opposite ends of said housing, said end stops being rotatable within said housing relative to said end caps and said canister;
   first and second abutment members on said rod; and
   said end stops being rotatable within said housing relative to said end caps and said canister for establishing engagement and disengagement positions between said end stops and said abutment members upon relative axial movement between said rod and said housing.

2. The stabilizer of claim 1, said end stops defining a shaped opening at least partly therethrough, said shaped opening including a central portion, spaced axial channels of greater radial extent than said central opening and lands between said channels; and said abutment members having peripheral shapes including lobes slidable through said spaced axial channels in said end stops when said lobes are aligned with said channels and said lobes abutting said lands when said stabilizer is in said engagement position.

3. The stabilizer of claim 2, said end stops defining three said axial channels, and said abutment members defining three said lobes.

4. The stabilizer of claim 2, said end stops defining four said axial channels, and said abutment members defining four said lobes.

5. The stabilizer of claim 2, including a spring in said housing biasing said end stops to one of said engagement and disengagement positions.

6. The stabilizer of claim 5, said spring biasing said end stops to said engagement position.

7. The stabilizer of claim 1, including a motor for selectively rotating said end stops within said housing.

8. A vehicle stabilizer comprising:
   a housing having a hollow canister with first and second end caps on opposite ends thereof, said canister being rotatably fixed relative to said end caps;
   a fixed end secured relative to said first end cap;
   a movable end connected to an axially movable rod, said rod extending through said second end cap and into said housing;
   a resilient member disposed on said rod in said housing;
   first and second washers on said rod at opposite ends of said resilient member;
   first and second end stops at opposite ends in said housing;
   said end stops being rotatable within said housing relative to said canister and having openings axially therein, said openings in said end stops each including a central portion and spaced channels radially outwardly from said central portion, with lands disposed between said channels;
   said first and second washers having peripheral shapes including radially outwardly extending lobes, said peripheral shapes being of size and configuration to slide into said channels in said end stops with said end stops in one rotated position, and said peripheral shapes being of size and configuration to abut said lands on said end stops in another rotated position.

9. The stabilizer of claim 8, said end stops being connected by a sleeve for co-rotation in said housing.

10. The stabilizer of claim 9, including a spring biasing said connected end stops and sleeve to a desired default rotational position relative to said first and second washers.

11. The stabilizer of claim 9, including a motor drivingly connected to one of said end stops for rotating said one of said end stops.

12. The stabilizer of claim 8, said end stops having three channels and three lands, and said washers having three lobes.

13. The stabilizer of claim 8, said end stops having four channels and four lands, and said washers having four lobes.

14. A vehicle stabilizer, comprising:
   a substantially enclosed housing;
   an end stop disposed in said housing;
   a rod movable axially in said housing;
   an abutment member on said rod;

one of said end stop and said abutment member being rotatable within said housing relative to said housing and to the other of said end stop and said abutment member;

said end stop and said abutment member having complementary shapes such that in one relative rotated position of said end stop and said abutment member a confronting relationship is established one against the other and in another rotated relative position of said end stop and said abutment member a telescoping relationship is established of one sliding within the other; and a spring acting against said abutment member axially in said housing with said abutment member confronting said end stop upon axial force being applied against said rod.

15. The vehicle stabilizer of claim 14, said end stop defining a shaped opening at least partly therethrough, said shaped opening including a central portion, spaced axial channels of greater radial extent than said central opening and lands between said channels; and said abutment member having a peripheral shape including lobes slidable through said spaced axial channels in said end stop when said lobes are aligned with said channels, and abutting said lands when aligned with said lands.

16. The vehicle stabilizer of claim 15, said end stop having three said axial channels and three said lands, and said abutment member having three said lobes.

17. The vehicle stabilizer of claim 15, said end stop having four said axial channels and four said lands, and said abutment member having four said lobes.

18. The vehicle stabilizer of claim 14 including a spring exerting rotational force against said one of said end stop and said abutment member, and biasing said one of said end stop and said abutment member to one of said confronting relationship and said telescoping relationship.

19. The vehicle stabilizer of claim 18, said spring exerting rotational force being contained within a spring housing at one end of said stabilizer.

20. The vehicle stabilizer of claim 14 including two said end stops, one said end stop at each end of said housing; and two said abutment members on said rod, and said spring being disposed between said abutment members.

21. The vehicle stabilizer of claim 20, said end stops defining elongated lands.

22. The vehicle stabilizer of claim 20, said end stops defining generally triangular lands.

23. The vehicle stabilizer of claim 20, including a motor connected to said end stops for rotating said end stops.

24. The vehicle stabilizer of claim 20, including a motor disposed in said housing and connected to said end stops for rotating said end stops.

25. The vehicle stabilizer of claim 20, including a cable access port defined in said housing and a cable extending into said port and connected to said end stops for rotating said end stops.

26. The vehicle stabilizer of claim 25, including a spring exerting rotational force against said one of said end stop and said abutment member, and biasing said one of said end stop and said abutment member to one of said confronting relationship and said telescoping relationship, said spring exerting rotational force being contained in a spring housing at the same end of said housing as said cable access port.

27. The vehicle stabilizer of claim 14 including a motor drivingly connected to said one of said end stop and said abutment member that is rotatable within said housing.

28. The vehicle stabilizer of claim 14 including a cable connected to said one of said end stop and said abutment member that is rotatable within said housing.

* * * * *